United States Patent
Song et al.

(10) Patent No.: US 10,846,854 B2
(45) Date of Patent: Nov. 24, 2020

(54) SYSTEMS AND METHODS FOR DETECTING CANCER METASTASIS USING A NEURAL NETWORK

(71) Applicant: SHENZHEN KEYA MEDICAL TECHNOLOGY CORPORATION, Shenzhen (CN)

(72) Inventors: Qi Song, Seattle, WA (US); Bin Kong, Charlotte, NC (US); Shanhui Sun, Princeton, NJ (US)

(73) Assignee: SHENZHEN KEYA MEDICAL TECHNOLOGY CORPORATION, Shenzhen (CN)

( * ) Notice: Subject to any disclaimer, the term of this patent is extended or adjusted under 35 U.S.C. 154(b) by 126 days.

(21) Appl. No.: 16/049,809

(22) Filed: Jul. 31, 2018

(65) Prior Publication Data
US 2019/0114770 A1 Apr. 18, 2019

Related U.S. Application Data

(60) Provisional application No. 62/572,046, filed on Oct. 13, 2017.

(51) Int. Cl.
*G06T 7/00* (2017.01)
*G06K 9/62* (2006.01)
*G06K 9/46* (2006.01)

(52) U.S. Cl.
CPC ........ *G06T 7/0014* (2013.01); *G06K 9/4628* (2013.01); *G06K 9/6261* (2013.01);
(Continued)

(58) Field of Classification Search
CPC ........ G06T 7/0012; G06T 2207/20021; G06T 2207/10056; G06T 2207/30024;
(Continued)

(56) References Cited

U.S. PATENT DOCUMENTS

| | | | |
|---|---|---|---|
| 6,993,169 B2 * | 1/2006 | Wetzel | G06K 9/00127 348/79 |
| 2014/0185891 A1 * | 7/2014 | Schoenmeyer | G06T 11/206 382/128 |

(Continued)

FOREIGN PATENT DOCUMENTS

| | | |
|---|---|---|
| CN | 105531665 A | 4/2016 |
| CN | 106600578 A | 4/2017 |

OTHER PUBLICATIONS

First Office action issued in related Chinese Application No. 201811184640.7, dated Mar. 30, 2020, 9 pages.
(Continued)

*Primary Examiner* — Golam Sorowar
(74) *Attorney, Agent, or Firm* — Bayes PLLC

(57) ABSTRACT

Embodiments of the disclosure provide systems and methods for detecting cancer metastasis in a whole-slide image. The system may include a communication interface configured to receive the whole-slide image and a learning model. The whole-slide image is acquired by an image acquisition device. The system may also include a memory configured to store a plurality of tiles derived from the whole-slide image in a queue. The system may further include at least one processor, configured to apply the learning model to at least two tiles stored in the queue in parallel to obtain detection maps each corresponding to a tile, and detect the cancer metastasis based on the detection maps.

20 Claims, 5 Drawing Sheets

(52) U.S. Cl.
CPC ......... *G06K 9/6263* (2013.01); *G06K 9/6271* (2013.01); *G06T 7/0012* (2013.01); *G06K 2209/05* (2013.01); *G06T 2207/10056* (2013.01); *G06T 2207/20081* (2013.01); *G06T 2207/20084* (2013.01); *G06T 2207/30068* (2013.01); *G06T 2207/30096* (2013.01)

(58) Field of Classification Search
CPC ......... G06T 11/206; G06T 2207/20016; G06T 7/11; G06T 2200/04; G06T 2207/10024; G06T 2207/10061; G06T 2207/20081; G06T 2207/20084; G06T 2207/20221; G06T 15/005; G06T 15/04; G06T 15/80; G06T 17/10; G06N 3/0454; G06N 3/08; G06N 3/04; G06N 7/005; G06N 20/00; G06N 3/0472; G06N 3/0481; G06N 3/082; G06N 3/084; G06K 9/4628; G06K 9/4642; G06K 9/6269; G06K 9/627; G06K 9/6277; G06K 2009/2045; G06K 2209/05; G06K 2209/051; G06K 2209/23; G06K 9/00134; G06K 9/0014; G06K 9/00248; G06K 9/00624; G06K 9/036; G06K 9/2054; G06K 9/4604; G06K 9/6215; G06K 9/6217; G06K 9/6223; G06K 9/6227
See application file for complete search history.

(56) References Cited

U.S. PATENT DOCUMENTS

| | | | |
|---|---|---|---|
| 2017/0147905 A1* | 5/2017 | Huang | G06K 9/6232 |
| 2017/0161891 A1* | 6/2017 | Madabhushi | G06T 7/0012 |
| 2018/0060719 A1* | 3/2018 | Kisilev | G06N 3/0454 |
| 2018/0114317 A1* | 4/2018 | Song | G06N 3/04 |
| 2018/0300933 A1* | 10/2018 | Burke | G06T 15/005 |
| 2018/0357800 A1* | 12/2018 | Oxholm | G06N 3/084 |

OTHER PUBLICATIONS

"Deep Learning for Identifying Metastatic Breast Cancer", Dayong Wang et al. «arXiv: 1606. 05718v1[q-bio.QM]», Jun. 18, 2016, 6 pages.

"ScanNet: A Fast and Dense Scanning Framework for Metastatic Breast Cancer Detection from Whole-Slide Images", Huangjing Lin, et al. «arXiv: 1707. 09597v1[cs.CV]», Jul. 30, 2017, 9 pages.

* cited by examiner

SYSTEMS AND METHODS FOR DETECTING CANCER METASTASIS USING A NEURAL NETWORK

CROSS REFERENCE TO RELATED APPLICATION

The present application is based on and claims the benefits of priority to U.S. Provisional Application No. 62/572,046, filed Oct. 13, 2017, which is incorporated herein by reference in its entirety.

TECHNICAL FIELD

The present disclosure relates to systems and methods for detecting cancer metastasis in a whole-slide image, and more particularly to, systems and methods for detecting cancer metastasis by processing tiles of a whole-slide image according to an asynchronous queue.

BACKGROUND

Early diagnosis can significantly reduce the death rate of breast cancer. Studies have shown that the five-year survival rate can be boosted from 24% to 99% when the breast cancer is diagnosed at an early stage. Clinically, cancer metastasis in lymph nodes is a commonly adopted criterion for early diagnosis, considering they are usually the first places the breast cancer metastasizes to. Gigapixel Whole-slide Images (WSIs) are useful, but they suffer from two major limitations. First, while the pathologists informative image modality has been widely used for this purpose, current examination process needs to exhaustively examine the extremely large WSIs (e.g., 200,000×100,000) to find the potential metastases. This procedure is time-consuming and error-prone. Additionally, because of large image and structure complexity, the inter- and intra-observer variabilities among pathologists are high, especially for those who lack of clinical experience.

Therefore, accurately and efficiently detecting cancer metastasis in lymph nodes imaged using WSIs is critical for early breast cancer diagnosis. Learning networks, such as Convolutional Neural Network (CNN) with powerful hierarchical architectures, have been applied to cancer metastasis detection to improve accuracy. For example, automatic detections using CNN could significantly outperform the pathologists. However, these methods face computational challenges due to the large size of WSIs and the large variances. For example, to achieve high accuracy, current methods usually divide the WSIs into heavily overlapping patches and analyze each one with powerful but computationally intensive models (e.g., Inception V3), which is extremely time-consuming.

One approach is to group the pixels into superpixels, so the computation is no longer conducted on the pixel level, thereby significantly reducing the computation. However, this approach typically uses "hand-crafted" features, which are not specifically designed for the WSI detection problem. Another approach is to leverage the state-of-the-art deep CNNs to tackle this problem. However, because of CNN's structure limitation, the input image should have a fixed size. Therefore, WSIs are often divided into small patches (e.g., 256×256) with each of them being processed independently. These attempts are computationally expensive and are not readily applicable to real clinical setups.

From clinical point of view, the detection method's computation efficiency determines whether it can be adopted as a pathologist's daily tool. Therefore, there is a need for Computer-Aided-Diagnosis (CAD) based cancer metastasis detection systems and methods to aid real clinical applications.

Embodiments of the disclosure address the above problems by systems and methods for accurately and efficiently detecting cancer metastasis in a whole-slide image based on a learning model.

SUMMARY

Embodiments of the disclosure provide a system for detecting cancer metastasis in a whole-slide image. The system may include a communication interface configured to receive the whole-slide image and a learning model. The whole-slide image is acquired by an image acquisition device. The system may also include a memory configured to store a plurality of tiles derived from the whole-slide image in a queue. The system may further include at least one processor, configured to apply the learning model to at least two tiles stored in the queue in parallel to obtain detection maps each corresponding to a tile, and detect the cancer metastasis based on the detection maps.

Embodiments of the disclosure also provide a method for detecting cancer metastasis in a whole-slide image. The method may include receiving the whole-slide image and a learning model. The whole-slide image is acquired by an image acquisition device. The method may further include reading a plurality of tiles derived from the whole-slide image into a queue, and reading at least two tiles from the queue. The method may also include applying, by a processor, the learning model to the at least two tiles stored in the queue in parallel to obtain detection maps each corresponding to a tile; and detecting, by the processor, the caner metastasis based on the detection maps.

Embodiments of the disclosure further provide a non-transitory computer-readable medium having instructions stored thereon that, when executed by one or more processors, causes the one or more processors to perform a method for detecting cancer metastasis in a whole-slide image. The method may include receiving the whole-slide image and a learning model. The whole-slide image is acquired by an image acquisition device. The method may further include reading a plurality of tiles derived from the whole-slide image into a queue, and reading at least two tiles from the queue. The method may also include applying the learning model to the at least two tiles stored in the queue in parallel to obtain detection maps each corresponding to a tile; and detecting the caner metastasis based on the detection maps.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
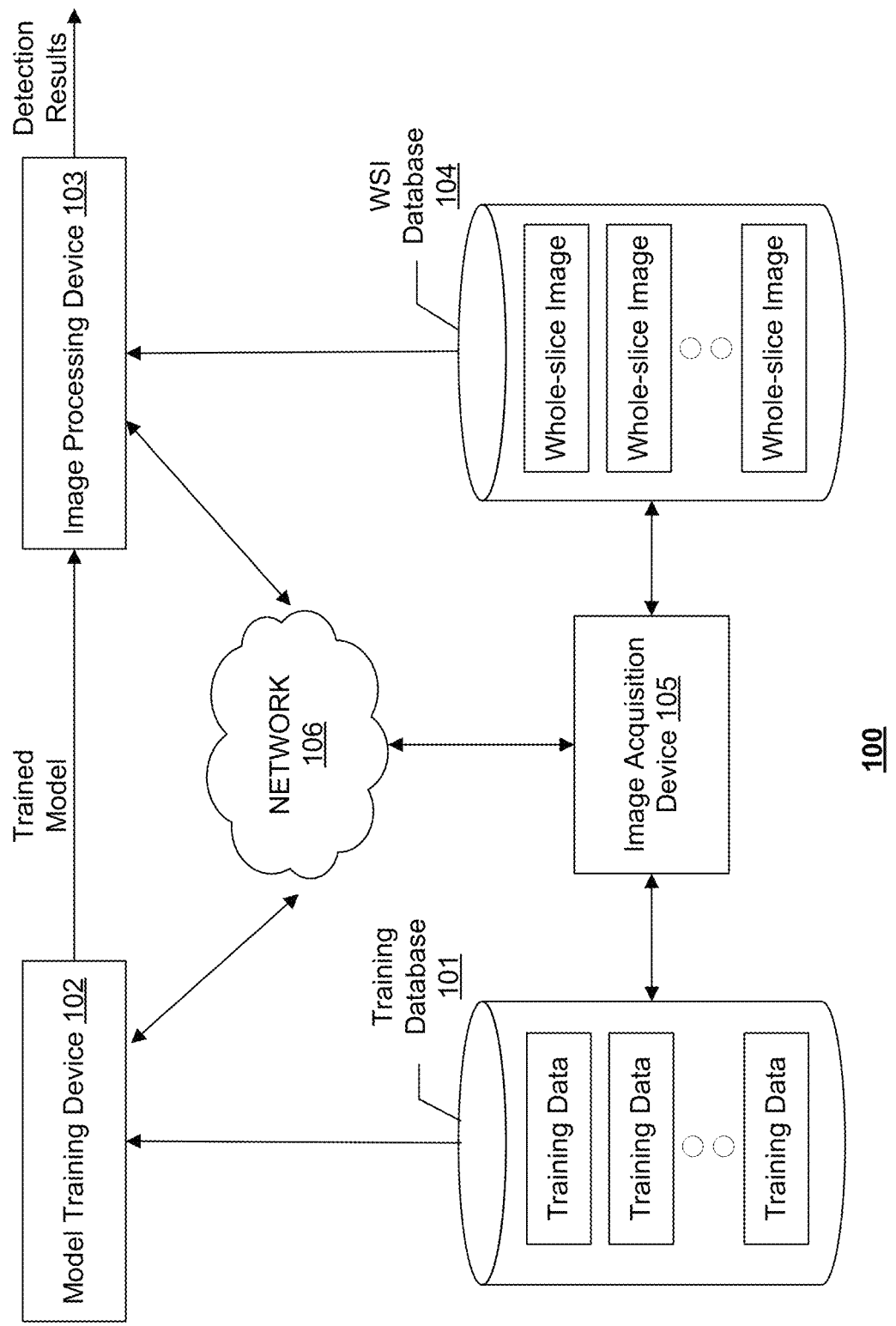
FIG. 1 illustrates a schematic diagram of an exemplary cancer metastasis detection system, according to embodiments of the disclosure.

FIG. 1 illustrates an exemplary cancer metastasis detection system 100, according to some embodiments of the present disclosure. Consistent with the present disclosure, cancer metastasis detection system 100 is configured to detect cancer metastasis in a WSI acquired by an image acquisition device 105. WSI is a digital imaging technique used in pathology. WSI, also commonly referred to "virtual microscopy," emulates conventional light microscopy in a computer-generated manner. Image acquisition device 105 may generate WSIs in two steps: first step utilizes specialized hardware (scanner) to digitize glass slides, which generates a large representative digital image (so-called "digital slide"), and the second step employs specialized software (e.g., virtual slide viewer) to view and/analyze these digital files.

Although the descriptions are made using WSIs as an example, it is contemplated that the disclosed systems and methods may also be applied or adapted to process images acquired using various other imaging modalities, including MRI, functional MRI (e.g., fMRI, DCE-MRI and diffusion MRI), CT, CBCT, Spiral CT, PET, SPECT, X-ray, optical tomography, fluorescence imaging, ultrasound imaging, and radiotherapy portal imaging, etc.

As shown in FIG. 1, cancer metastasis detection system 100 may include components for performing two stages, a training stage and a detection stage. To perform the training stage, cancer metastasis detection system 100 may include a training database 101 and a model training device 102. To perform the detection stage, cancer metastasis detection system 100 may include an image processing device 103 and a WSI database 104. In some embodiments, cancer metastasis detection system 100 may include more or less of the components shown in FIG. 1. For example, when a learning model for cancer metastasis detection is pre-trained and provided, cancer metastasis detection system 100 may only include image processing device 103 and WSI database 104.

Cancer metastasis detection system 100 may optionally include a network 106 to facilitate the communication among the various components of cancer metastasis detection system 100, such as databases 101 and 104, devices 102, 103, and 105. For example, network 106 may be a local area network (LAN), a wireless network, a cloud computing environment (e.g., software as a service, platform as a service, infrastructure as a service), a client-server, a wide area network (WAN), etc. In some embodiments, network 106 may be replaced by wired data communication systems or devices.

In some embodiments, the various components of cancer metastasis detection system 100 may be remote from each other or in different locations, and be connected through network 106 as shown in FIG. 1. In some alternative embodiments, certain components of cancer metastasis detection system 100 may be located on the same site or inside one device. For example, training database 101 may be located on-site with or be part of model training device 102. As another example, model training device 102 and image processing device 103 may be inside the same computer or processing device.

As shown in FIG. 1, model training device 102 may communicate with training database 101 to receive one or more sets of training data. Each set of training data may include a WSI image and its corresponding ground truth detection map that provides the detection result to each of the pixel of the WSI image. Training images stored in training database 101 may be obtained from a medical image database containing previously acquired medical images for pathology use.

Model training device 102 may use the training data received from training database 101 to train a learning model for detecting cancer metastasis in a WSI. Model training device 102 may be implemented with hardware specially programmed by software that performs the training process. For example, model training device 102 may include a processor and a non-transitory computer-readable medium. The processor may conduct the training by performing instructions of a training process stored in the computer-readable medium. Model training device 102 may additionally include input and output interfaces to communicate with training database 101, network 106, and/or a user interface (not shown). The user interface may be used for selecting sets of training data, adjusting one or more parameters of the training process, selecting or modifying a framework of the learning model, and/or manually or semi-automatically providing detection results associated with an image for training.

Consistent with some embodiments, the learning model may be a CNN model or an FCN model. The CNN/FCN model may be trained using supervised learning. The architecture of a CNN/FCN model includes a stack of distinct layers that transform the input into the output. Examples of the different layers may include one or more convolution layers or fully-convolutional layers, non-linear operator layers, pooling or subsampling layers, fully connected layers, and/or final loss layers. Each layer may connect one upstream layer and one downstream layer.

As used herein, "training" a learning model refers to determining one or more parameters of at least one layer in the learning model. For example, a convolutional layer of a CNN model may include at least one filter or kernel. One or more parameters, such as kernel weights, size, shape, and structure, of the at least one filter may be determined by e.g., a backpropagation-based training process.

Consistent with the present disclosure, the FCN model may be trained directly by model training device 102 using the training data or transformed from a trained CNN model. In some embodiments, the convolutional layers in a CNN model may be transformed to fully-convolutional layers in an FCN model. Unlike a CNN model that can only process an input of a set size, an FCN model can process input of an arbitrary size (e.g., the entire WSI). Therefore, the FCN model may offer more flexibility than the CNN model for image processing device 103. Using an FCN transformed from a CNN (e.g., Inception V3), the resulting probability map will be the same as using the CNN architecture itself except that the latter uses a sufficiently small stride.

Image processing device 103 may receive at least one FCN model from model training device 102. Image processing device 103 may include a processor and a non-transitory computer-readable medium (discussed in detail in connection with FIG. 2). The processor may perform instructions of a cancer metastasis detection process stored in the medium. Image processing device 103 may additionally include input and output interfaces (discussed in detail in connection with FIG. 2) to communicate with WSI database 104, network 106, and/or a user interface (not shown). The user interface may be used for selecting a WSI for diagnosis, initiating the detection process, displaying the WSI image and/or the detection results.

Image processing device 103 may communicate with WSI database 104 to receive one or more WSIs. In some embodiments, the WSIs stored in WSI database 104 may be obtained from a medical image database maintained by a pathology department. The WSIs may be acquired by image acquisition device 105. Image processing device 103 may use the trained model received from model training device 102 to predict whether each pixel or superpixel of the WSI corresponds to cancer metastasis, and output a detection map. Consistent with some embodiments, the WSI may be divided into tiles (e.g., patches) and image processing device 103 may perform cancer metastasis detection in each tile. In some embodiments, image processing device 103 may read the tiles into memory and store them in a queue at a different speed from the speed at which the tiles are read out from the memory and processed. In some embodiments, image processing device 103 may include multiple processors for processing tiles in parallel. The queue is therefore an asynchronous queue with different in and out speeds. The detection maps obtained for the tiles may be merged to obtain the detection results for the entire WSI. In some embodiments, the WSI and its corresponding detection map may be automatically stored in training database 101 and become an additional training sample.

Figure 2:
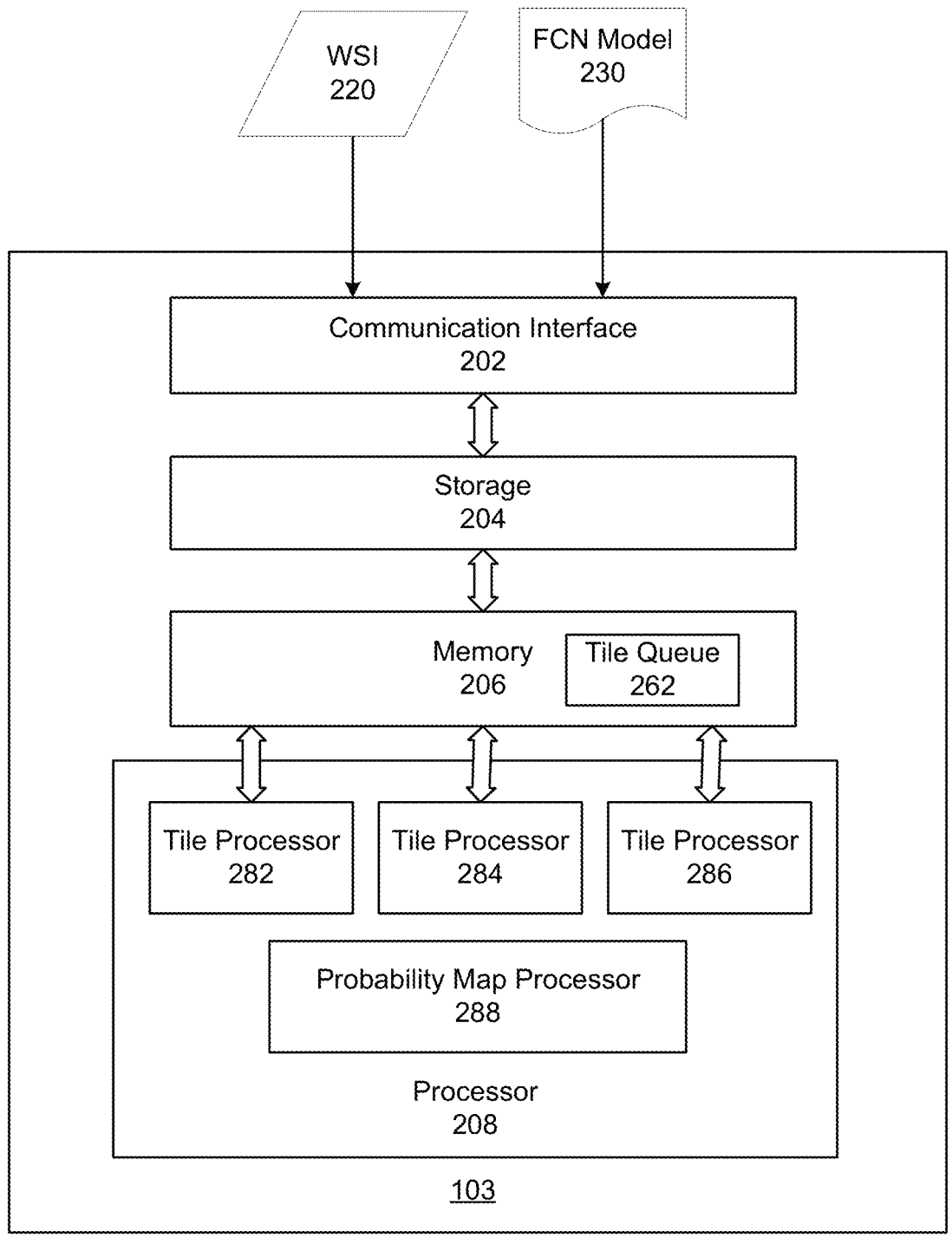
FIG. 2 illustrates a block diagram of an exemplary image processing device, according to embodiments of the disclosure.

FIG. 2 illustrates an exemplary image processing device 103, according to some embodiments of the present disclosure. In some embodiments, image processing device 103 may be a special-purpose computer, or a general-purpose computer. For example, image processing device 103 may be a computer custom-built for hospitals to perform image acquisition and image processing tasks. As shown in FIG. 2, image processing device 103 may include a communication interface 202, a storage 204, a memory 206, and a processor 208.

Communication interface 202 may include a network adaptor, a cable connector, a serial connector, a USB connector, a parallel connector, a high-speed data transmission adaptor, such as fiber, USB 3.0, thunderbolt, and the like, a wireless network adaptor, such as a WiFi adaptor, a telecommunication (3G, 4G/LTE and the like) adaptor, etc. Image processing device 103 may be connected to other components of system 100 and network 106 through communication interface 202. In some embodiments, communication interface 202 may receive WSI 220 from WSI database 104, and FCN model 230 from modeling training device 102.

Storage 204/memory 206 may be a non-transitory computer-readable medium, such as a read-only memory (ROM), a random access memory (RAM), a phase-change random access memory (PRAM), a static random access memory (SRAM), a dynamic random access memory (DRAM), an electrically erasable programmable read-only memory (EEPROM), other types of random access memories (RAMs), a flash disk or other forms of flash memory, a cache, a register, a static memory, a compact disc read-only memory (CD-ROM), a digital versatile disc (DVD) or other optical storage, a cassette tape or other magnetic storage devices, or any other non-transitory medium that may be used to store information or instructions capable of being accessed by a computer device, etc.

In some embodiments, storage 204 may store the trained model(s), e.g., FCN model 230 or a CNN model, and data used or generated while executing the computer programs, such as WSI 220, etc. In some embodiments, memory 206 may store computer-executable instructions, such as one or more image processing programs. Consistent with the present disclosure, memory 206 may additionally store a tile queue 262. In some embodiments, a WSI stored in storage 204 may be divided into multiple tiles. Each tile is an image patch, containing a subset of the WSI. In some embodiments, the tiles may be partially overlapping with other. The tiles may be read from storage 204 one by one and stored in memory 206 to form tile queue 262. In some embodiments, the tiles may be read and stored in tile queue 262 at a first speed.

Processor 208 may be a processing device that includes one or more general processing devices, such as a microprocessor, a central processing unit (CPU), a graphics processing unit (GPU), and the like. More specifically, the processor may be a complex instruction set computing (CISC) microprocessor, a reduced instruction set computing (RISC) microprocessor, a very long instruction word (VLIW) microprocessor, a processor running other instruction sets, or a processor that runs a combination of instruction sets. The processor may also be one or more dedicated processing devices such as application specific integrated circuits (ASICs), field programmable gate arrays (FPGAs), digital signal processors (DSPs), system-on-chip (SoCs), and the like. Processor 208 may be communicatively coupled to memory 206 and configured to execute the computer-executable instructions stored thereon.

In some embodiments, processor 208 may include multiple tile processors 282-286. Processor 208 may read image tiles from tile queue 262 and distribute them among tile processors 282-286. Consistent with the present disclosure, tile processors 282-286 may analyze tiles in parallel to determine detection maps for the respective tiles. In some embodiments, because tile analysis is relatively time-consuming, the tiles may be read out of tile queue 262 at a second speed lower than the first speed at which the tiles are read into tile queue 262. That is, tile queue 262 may be an asynchronous queue. In some embodiments, the tiles may be analyzed using the FCN model to determine a cancer metastasis detection map for each tile. In some embodiments, the detection map may be a probability map indicating the probability of each pixel in the tile being corresponding to cancer metastasis. Although the description focuses on embodiments where the second speed (speed reading tiles out of queue 262) is lower than the first speed (speed reading tiles into queue 262), it is contemplated that in some embodiments, the second speed can be higher than the first speed. In that case, processor 208 can include multiple tile readers to read the tiles into queue 262 in parallel.

Processor 208 may additionally include a probability map processor 288. Probability map processor 288 may be configured to post-process the detection maps (e.g., probability map) for the respective tiles to obtain the cancer metastasis detection results for the entire WSI.

Figure 3:
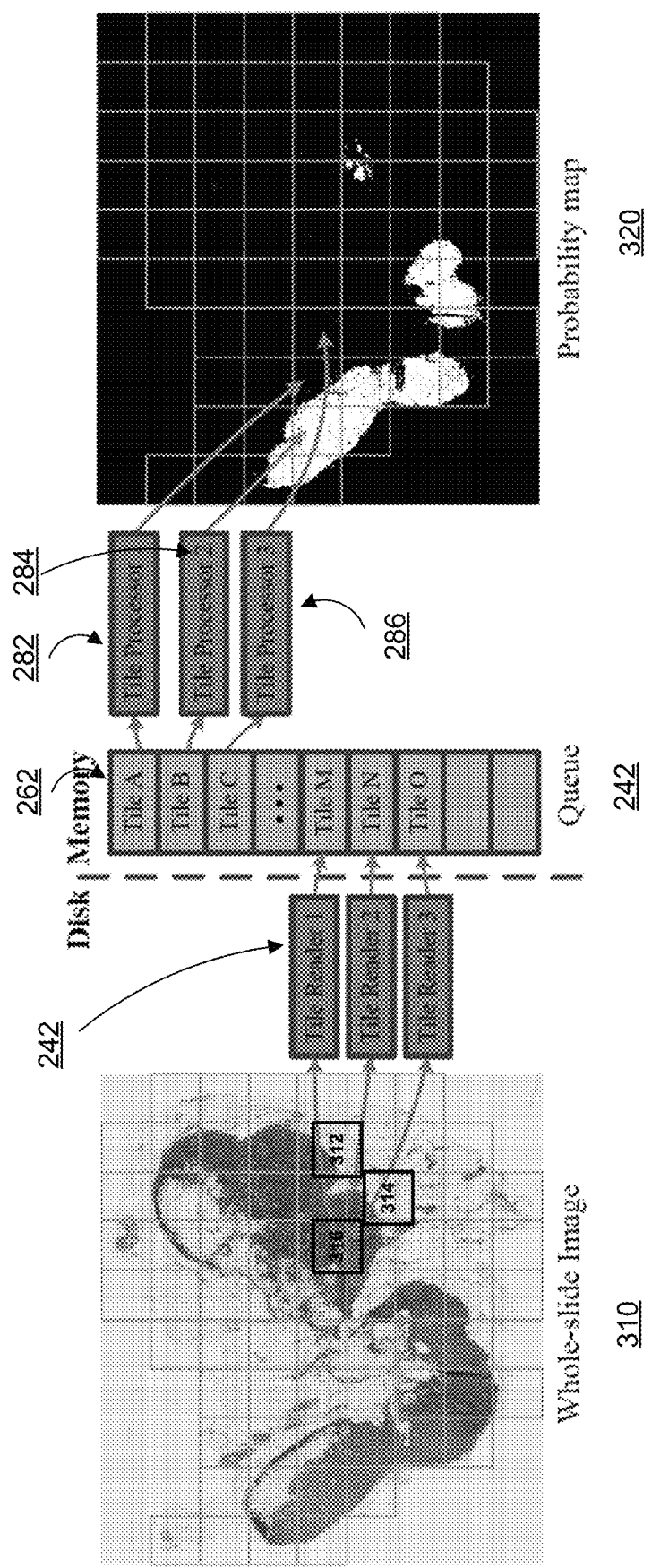
FIG. 3 illustrates an exemplary WSI and an asynchronous queue to process the same, according to embodiments of the disclosure.

FIG. 3 illustrates an exemplary WSI 310 and an asynchronous queue 262 to process the same, according to embodiments of the disclosure. WSI may be extremely large (e.g., 200,000×100,000) and it is therefore computationally expensive to analyze the entire WSI. In some embodiments, WSI 310 is preprocessed to segment the tissue regions and non-tissue region. By only analyzing the tissue regions, the computation task can be reduced in size. In some embodiments, image processing device 103 may further divide the tissue regions into small tiles, e.g., tiles 312-316. The tiles are read into memory 206 by tile readers 242 and stored in tile queue 262. In some embodiments, the tiles (e.g., tiles A-O) are stored in tile queue 262 in the order they are received by memory 206.

Consistent with the present disclosure, the tiles stored in tile queue 262 may be read out by processor 208 and assigned to different threads. For example, the tiles may be assigned to multiple tile processors 282-286 for parallel processing. Each tile processor 282-286 determines a detection map (e.g., probability map) for the tile being analyzed. The detection maps may be merged to obtain an overall detection map 320 for the entire WSI. For example, the detection maps may be placed in a position of overall detection map 320 corresponding to the position of the respective tiles in WSI 310. In some embodiments, overall detection map 320 may be post-processed to obtain the prediction results.

In some embodiments, tile processors 282-286 may become the computational bottleneck given the CNN models only take a set size of tiles. Because fully-connected layers of a CNN model are equivalent to fully convolutional layers of an FCN model, in some embodiments, modeling training device 102 may transform a trained CNN into an FCN model by transforming the last fully-connected layers of the CNN model into equivalent convolutional layers and make it fully convolutional. After the transformation, the FCN can take input of arbitrary size (e.g., the whole WSI 310), and output a probability map. The size of the probability map depends on the receptive field k of the original CNN and the down-sample rate d. Regardless of the boundary, the size of the probability map is the original WSI size multiplied by a factor of 1/d.

In some embodiments, each pixel in the probability map $x_{prob}$ ($x_{prob}=0,1,2,\ldots$) for a tile can be mapped back to the location $x_{WSI}(x_{prob}=b\ 0,1,2,\ldots)$ of the original WSI, based on the following equation:

$$x_{WSI} = d \cdot x_{prob} + \left\lfloor \frac{k-1}{2} \right\rfloor. \quad (1)$$

In other words, each prediction value $x_{prob}$ in the probability map depends on the pixel $x_{WSI}$ and its left and right $$\left\lfloor \frac{k-1}{2} \right\rfloor$$

pixels of the original WSI. Accordingly, the resulting probability produced by the FCN is equivalent to that produced by the original CNN on the WSI with stride c. The size of the probability map $size_{prob}$ can be determined (potentially with padding for the boundary pixels) based on the WSI size $size_{WSI}$ according to the following equation:

$$size_{prob} = \left\lceil \frac{size_{WSI} - (k-d)}{d} \right\rceil. \quad (2)$$

In one specific example, suppose a WSI to be analyzed has an image size of 163,840×93,184 and an Inception V3 model is used for the analysis. The original Inception V3 model may take input of size 299×299 and produce a single prediction value. In other words, the model has an effective receptive field size of 299. As the Inception V3 model down-samples the original input for 5 times (either with pooling or convolution with stride 2), it down-samples the input image by a factor of $2^5=32$. In some embodiments, model training device 102 may transform the last fully-connected layers of this Inception V3 model into equivalent convolutional layers and make it fully convolutional. The resulted FCN model will be able to take variable sized input. In this specific example, according to Equation (2), it will produce a probability map of size $$\left\lceil \frac{163,840 - (299-32)}{32} \right\rceil \times \left\lceil \frac{93,184 - (299-32)}{32} \right\rceil = 5112 \times 2904.$$

In some embodiments, such as in the specific example above, the whole gigapixel WSI may not be fed into a single GPU memory due to a limited memory size. Accordingly, the WSI may be divided into tiles for parallel processing using multiple threads. Consistent with the present disclosure, the tiles may be partially overlapping with other, in order for the FCN model to yield the equivalent results as if a CNN model is used. For example, for a CNN model with receptive field of k and a down-sampling rate of d, the overlapping size may be determined as k-d. For example, FIG. 4A illustrates exemplary overlapping tiles 412 and 414, according to embodiments of the disclosure. As shown, tiles 412 and 414 share at least some common pixels in each dimension. Note FIG. 4A is not necessarily drawn in scale to show the extent of overlapping. For example, in the embodiment described above, the overlapping size is only 267 when the tile size is 2091.

Figure 4B:
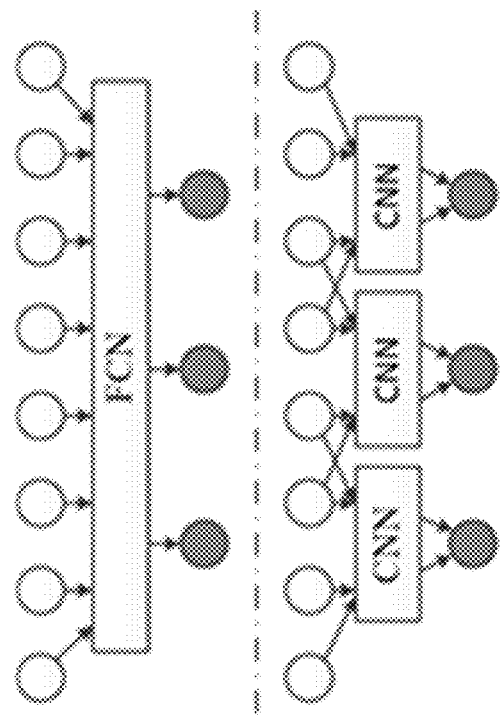
FIG. 4B illustrates an exemplary transformation between a CNN model and a Fully Convolutional Neural Network (FCN) model, according to embodiments of the disclosure.
Figure 4A:
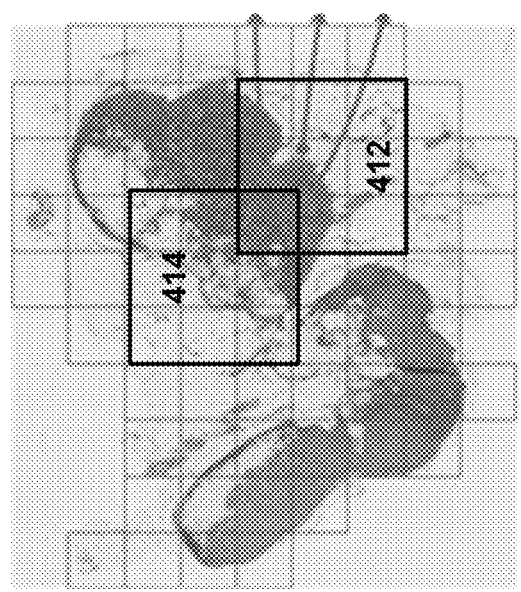
FIG. 4A illustrates exemplary overlapping tiles, according to embodiments of the disclosure.

FIG. 4B illustrates an exemplary transformation from a CNN model to an FCN model, according to embodiments of the disclosure, and explains the concept behind using overlapping tiles. For illustration purpose, a 1D CNN with a down-sample factor d=2 and an effective receptive field k=4 is used, although practically 2D or higher-dimensional CNNs are used for processing the WSIs. The 1D CNN therefore takes an input of size 4 and provides an output of size 1. After transforming the CNN into an FCN, the FCN can take input of an arbitrary size. For example, if the input size is 8, there will be 3 output units (top of FIG. 4B). The result is equivalent to the evaluation of the original CNN on the input with stride 2 (bottom of FIG. 4B). That is, in order for the FCN to produce the equivalent prediction results, the input parts should overlap by k-d=2 between each other.

Figure 5:
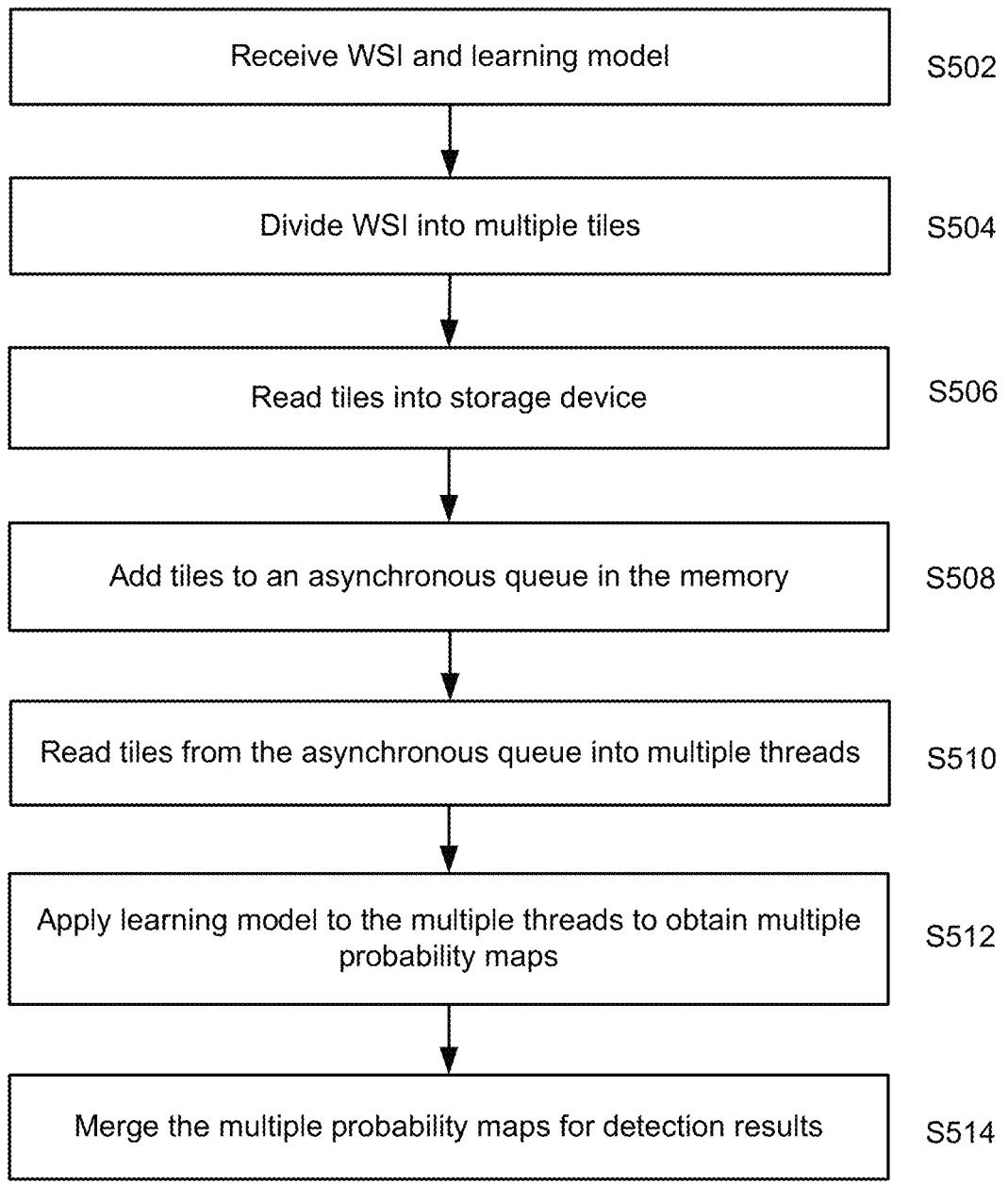
FIG. 5 illustrates a flow chart of an exemplary process for detecting cancer metastasis in a WSI, according to embodiments of the disclosure.

FIG. 5 illustrates a flow chart of an exemplary process 500 for detecting cancer metastasis in a WSI, according to embodiments of the disclosure. For example, method 500 may be implemented by cancer metastasis detection system 100, or more specifically, image processing device 103, in FIG. 1. However, method 500 is not limited to that exemplary embodiment. Method 500 may include steps S502-S514 as described below. It is to be appreciated that some of the steps may be optional to perform the disclosure provided herein. Further, some of the steps may be performed simultaneously, or in a different order than shown in FIG. 5.

In step S502, image processing device 103 may receive a WSI and a learning model. For example, image processing device 103 may receive WSI 220 from WSI database 104. The learning model may be trained in advance or on the fly by model training device 102. In some embodiments, the learning model may be a CNN model such as an Inception V3 model, or FCN model 230. FCN model 230 may be trained by model training device 102 directly using training data obtained from training database 101, or transformed from a trained CNN model. The transformation may be performed by model training device 102 or by image processing device 103. In some embodiments, fully-connected layers of the CNN model may be transformed to convolutionally layers and made fully convolutional.

In step S504, WSI 220 may be divided into multiple tiles. Each tile may include a subset of pixels of WSI 220. In some embodiments, when an FCN transformed from a CNN is used for image analysis, the tiles may be divided such that they overlap with each other as illustrated in FIG. 4A. For example, for a receptive field size of k and a down-sample factor of d, the overlapping size may be set as k-d in each image dimension.

In step S506, the image tiles (e.g., tiles 312-316 or 412-414) may be read into storage 204 by tile readers 242. In step S508, the tiles may be added to a tile queue 262 in memory 206. In some embodiments, tile queue 262 may be asynchronous. In other words, tile queue 262 may be a buffer queue, such that the tiles are read into the queue at a speed different from that of the tiles being read out of the queue. For example, five tiles may be read into tile queue 262 per second, while only three tiles are read out from the queue. Tile queue 262 therefore helps to hide the input/output latency.

In step S510, the tiles may be read by processor 208 from tile queue 262 into multiple threads. For example, process 208 may read one tile into each of tile processor 282-286. In some embodiments, the tiles in the multiple threads may be processed in parallel, e.g., simultaneously. In step S512, the learning model may be applied to analyze the tile in each thread, e.g., by one of tile processors 282-286, and obtain a probability map. The probability map indicates the likelihood of each tile pixel being corresponding to cancer metastasis.

In step S514, the multiple probability maps obtained in step S512 may be merged to determine the detection/predication results for the entire WSI. In some embodiments, the predication result (e.g., pixel values) of each probability map may be mapped, one-to-one, to a pixel of the WSI, e.g., according to Equation (1). Because the tiles may overlap with each other, some WSI pixels therefore might have multiple predication results mapped from different probability maps. Various methods may be used to merge such predication results. For example, the maximum probability value may be assigned to as the predication result for the WSI pixel. As another example, an average or median value might be selected. The overall detection map determined for the entire WSI may be provided to a pathologist for review.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

The disclosed systems and methods have been validated using WSIs of large size. A baseline is created by using a CNN architecture (an Inception V3 model). In the baseline experiment, the WSIs are divided into tiles of size 299×299 with stride of 128. The tiles are evaluated sequentially without implementing the asynchronous queue disclosed in this disclosure. One batch of tiles (27 tiles) are read into the GPU memory at a time and processed with the trained Inception V3 model. In the second experiment, the asynchronous queue is implemented to hide the I/O latency and 3 threads are used to read tiles into 3 GPUs for processing by the Inception V3 model in parallel. In the third experiment, the trained Inception V3 is transformed into an FCN model. In this experiment, the WSIs are divided into overlapping tiles of size 2091×2091 with stride 1824. That means the neighboring patches have an overlapping of 267. The validation shows that the second experiment (with the queue implementation only) can achieve a more than 50% reduction in time compared to the baseline experiment, and the third experiment (with the queue implementation and model transformation) can achieve more than 85% reduction in processing time.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for detecting cancer metastasis in a whole-slide image, comprising:
   a communication interface configured to receive the whole-slide image and a learning model, the whole-slide image being acquired by an image acquisition device;
   a memory configured to store a plurality of tiles derived from the whole-slide image in a queue; and
   at least one processor, configured to:
   apply the learning model as a same learning model to at least two tiles stored in the queue in parallel to obtain detection maps each corresponding to a tile,
   wherein the plurality of tiles include partially overlapping tiles,
   wherein the learning model is a fully convolutional neural network, and the processor is further configured to transform a convolutional neural network model to the fully convolutional neural network model,
   wherein the overlapping tiles share k–d pixels in each dimension, where k is a receptive field of the convolutional neural network model or of the fully convolutional neural network, and d is a down-sample rate; and
   detect the cancer metastasis based on the detection maps.

2. The system of claim 1, wherein to transform the convolutional neural network model to the fully convolutional neural network model, the processor is further configured to transform a fully-connected layer of the convolutional neural network model into an equivalent fully convolutional layer.

3. The system of claim 1, wherein the detection map is a probability map indicative of a probability of each pixel of the whole-slide image corresponding to cancer metastasis.

4. The system of claim 1, wherein the queue is an asynchronous queue where the plurality of tiles are read into the queue at a first speed and read out of the queue by the processor at a second speed different from the first speed.

5. The system of claim 1, wherein the at least one processor comprises a plurality of graphics processing units (GPUs), wherein the learning model is applied as a same learning model in each graphics processing unit (GPU) of the plurality of GPUs.

6. The system of claim 1, the at least one processor further configured to:
derive the plurality of tiles from the whole-slide image by dividing the whole slide image into overlapping tiles.

7. The system of claim 6, wherein a degree of overlap of the overlapping tiles is controlled according to a receptive field size and a down-sample factor.

8. The system of claim 1, the at least one processor further configured to:
derive the plurality of tiles from the whole-slide image by segmenting the whole slide image to include at least one tissue region and exclude at least one non-tissue region, and dividing the at least one tissue region into the plurality of tiles.

9. A method for detecting cancer metastasis in a whole-slide image, comprising:
receiving the whole-slide image and a learning model, the whole-slide image being acquired by an image acquisition device;
reading a plurality of tiles derived from the whole-slide image into a queue; and
reading, by at least one processor, at least two tiles from the queue;
applying, by the at least one processor, the learning model to the at least two tiles stored in the queue in parallel to obtain detection maps each corresponding to a tile,
wherein the plurality of tiles include partially overlapping tiles,
wherein the learning model is a fully convolutional neural network, and the processor is further configured to transform a convolutional neural network model to the fully convolutional neural network model,
wherein the overlapping tiles share k–d pixels in each dimension, where k is a receptive field of the convolutional neural network model or of the fully convolutional neural network, and d is a down-sample rate; and
detecting, by the at least one processor, the cancer metastasis based on the detection maps.

10. The method of claim 9, wherein transforming further includes transforming a fully-connected layer of the convolutional neural network model into an equivalent fully convolutional layer.

11. The method of claim 9, wherein the detection map is a probability map indicative of a probability of each pixel of the whole-slide image corresponding to cancer metastasis.

12. The method of claim 9, further comprising training the fully convolutional neural network model based on training images.

13. The method of claim 9, wherein the queue is an asynchronous queue, wherein reading the plurality of tiles into the queue is at a first speed and reading the at least two tiles out of the queue is at a second speed different from the first speed.

14. The method of claim 9, further comprising:
deriving, by the at least one processor, the plurality of tiles from the whole-slide image by dividing the whole slide image into overlapping tiles.

15. The method of claim 14, wherein a degree of overlap of the overlapping tiles is controlled according to a receptive field size and a down-sample factor.

16. The method of claim 9, further comprising:
deriving, by the at least one processor, the plurality of tiles from the whole-slide image by segmenting the whole slide image to include at least one tissue region and exclude at least one non-tissue region, and dividing the at least one tissue region into the plurality of tiles.

17. The method of claim 9, wherein the queue comprises an asynchronous queue and the reading the plurality of tiles into the queue occurs at a different speed from the reading the plurality of tiles from the queue.

18. A non-transitory computer-readable medium having a computer program stored thereon, wherein the computer program, when executed by at least one processor, performs a method for detecting cancer metastasis in a whole-slide image, the method comprising:
receiving the whole-slide image and a learning model, the whole-slide image being acquired by an image acquisition device;
reading a plurality of tiles derived from the whole-slide image into a single queue; and
reading at least two tiles from the queue;
applying the learning model as a same learning model to the at least two tiles stored in the queue in parallel to obtain detection maps each corresponding to a tile,
wherein the plurality of tiles include partially overlapping tiles,
wherein the learning model is a fully convolutional neural network, and the processor is further configured to transform a convolutional neural network model to the fully convolutional neural network model,
wherein the overlapping tiles share k–d pixels in each dimension, where k is a receptive field of the convolutional neural network model or of the fully convolutional neural network, and d is a down-sample rate; and
detecting the cancer metastasis based on the detection maps.

19. The non-transitory computer-readable medium of claim 18, wherein the queue comprises an asynchronous queue and the reading the plurality of tiles into the queue occurs at a different speed from the reading the plurality of tiles from the queue.

20. The non-transitory computer-readable medium of claim 18, wherein the method further comprises:
deriving, by the at least one processor, the plurality of tiles from the whole-slide image by dividing the whole slide image into overlapping tiles, wherein a degree of overlap of the overlapping tiles is controlled according to a receptive field size and a down-sample factor.

* * * * *